2,901,513
PROCESS FOR THE STABILIZATION OF AMINO ALCOHOLS

Robert M. Thomas, Niagara Falls, N.Y., assignor to Olin Mathieson Chemical Corporation, a corporation of Virginia No Drawing. Application December 31, 1956
Serial No. 631,510

5 Claims. (Cl. 260—584)

My invention relates to a novel method for treating ethanolamines to reduce their tendency to discolor when exposed to light and/or air and to new ethanolamine compositions characterized by their reduced tendency to discolor and their reduced discoloration.

It is well known that mono-, di-, and triethanolamines tend to discolor upon exposure to light and/or air. Moreover, these discolorations cannot be prevented by many known oxidation inhibitors, such as hydroquinone and sodium nitrite, and cannot be removed by adsorbents such as carbon black. Thus, while an acceptable product can be obtained by fractionation, it is difficult to maintain the generally required color (20 APHA). Traces of iron are especially detrimental and distillation and shipping of an uninhibited material is complicated by this.

It is an object of my invention to provide ethanolamines having a reduced tendency to discolor. It is also an object of my invention to provide ethanolamines of reduced color from ethanolamines which are discolored.

Thus, I have discovered that hydrazine will prevent color formation in an ethanolamine and, in instances where the discoloration is not excessive, for example, where it does not exceed about 100 APHA, will also serve as a bleach. In other words, the addition of hydrazine will restore a slightly off-color material to specification requirements and it will do so without requiring distillation.

According to my invention, a mono-, di-, or triethanolamine to which as little as 25 to 50 parts per million of hydrazine by weight has been added will be stabilized against color formation, so long as the addition is made before a color higher than 20 APHA has developed. Larger amounts of hydrazine can be used, up to 0.50 weight percent or more, but the use of such large amounts is not necessary or economically attractive where the color is only 20 APHA or less. Preferably, the addition is made before a color of 10 APHA has developed. Thus, the color of an ethanolamine which has been freshly distilled from its reaction mixture with a 5 to 10 APHA can be stabilized with 25 to 50 parts per million of hydrazine by weight. After such addition, light generally has no effect on the mixture. However, air will slowly consume the hydrazine. Exclusion of air is, therefore, advantageous. The mixture requires no further treatment and is ready for use or shipment. The stabilized material can be put in carbon steel or stainless steel containers without fear of color development. Glass lined containers are, of course, also suitable.

Where an ethanolamine has a color greater than 20 APHA but not exceeding 100 APHA, larger quantities of hydrazines are required. These serve not only to stabilize the color formation in the ethanolamines, but also to bleach the mixture and reduce the discoloration already present. Up to 0.50 percent by weight of hydrazine can be used in this manner economically. Thereafter, the addition becomes uneconomical, though it is not otherwise detrimental.

The following examples serve to illustrate the instability of ethanolamines as well as the stability of the product of this invention.

Example I

Three samples of diethanolamine, having an initial color of 5 APHA, were treated by the addition of 0.03 percent of hydrazine by weight to each. One of the samples was allowed to stand in glass, one in contact with carbon steel, and one in contact with 304 stainless steel. All of these samples were exposed to air and subdued light, at room temperature. After 60 days, no increase in APHA color could be observed.

When a fourth sample of the same diethanolamine was exposed to air and subdued light, without the addition of hydrazine, the color rose from 5 APHA to 50 APHA by the 14th day.

Example II

The test described in Example I was repeated at 120° F., instead of room temperature, with 3 additional samples of diethanolamine containing hydrazine. The original APHA color was 5, and remained 5 after 7 days.

A fourth sample, containing no hydrazine, showed an increase in color from 5 APHA originally to 35 APHA by the 7th day.

Example III

A sample of diethanolamine having a color of 50 APHA was treated by the addition of 0.01 weight percent of hydrazine. After standing for 19 days, the color had dropped to 20 APHA.

Example IV

A sample of diethanolamine, similar to the uninhibited sample of Example I, was treated with 50 parts per million of hydrazine by weight. The original color of the sample was 5 APHA. No color change was detectable after 35 days.

Example V

A sample of triethanolamine, having an initial color of 40 APHA was allowed to stand exposed to air, at room temperature, for 57 days. During this time the color rose to 170 APHA. When a second sample of the triethanolamine, treated with 25 parts per million of hydrazine, stood in air at room temperature for 57 days, the color rose to only 130 APHA.

I claim:

1. As a new composition of matter, an ethanolamine chosen from the group consisting of monoethanolamine, diethanolamine, and triethanolamine containing hydrazine in an amount of substantially 25 parts per million to 0.50 percent by weight, the said ethanolamine having a color not exceeding 100 APHA before the addition of the hydrazine.

2. As a new composition of matter, mono-ethanolamine containing hydrazine in an amount of substantially 25 parts per million to 0.50 percent by weight, the said ethanolamine having a color not exceeding 100 APHA before the addition of the hydrazine.

3. As a new composition of matter, di-ethanolamine containing hydrazine in an amount of substantially 25 parts per million to 0.50 percent by weight, the said ethanolamine having a color not exceeding 100 APHA before the addition of the hydrazine.

4. As a new composition of matter, tri-ethanolamine containing hydrazine in an amount of substantially 25 parts per million to 0.50 percent by weight, the said ethanolamine having a color not exceeding 100 APHA before the addition of the hydrazine.

5. The process comprising adding hydrazine in an amount of substantially 25 parts per million to 0.50 percent by weight to an ethanolamine chosen from the group consisting of monoethanolamine, diethanolamine, and triethanolamine having a color not exceeding 100 APHA.

References Cited in the file of this patent

Audrieth et al.: The Chemistry of Hydrazine (1951), pp. 226–227.